July 24, 1973          G. A. KEMENY          3,748,196
METHOD OF UTILIZING HEAT AND PRESSURE TO CURE
FLAWS IN METAL PIECES          3 Sheets-Sheet 1
Original Filed May 20, 1968
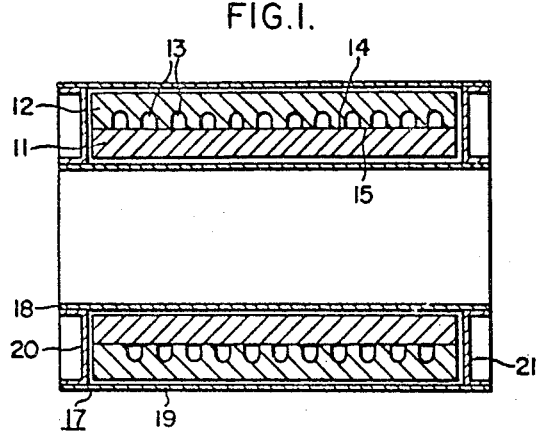
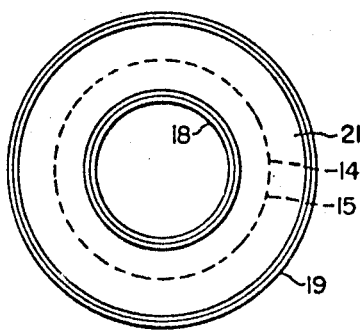
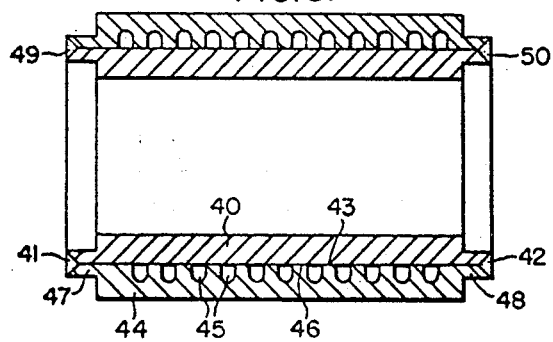
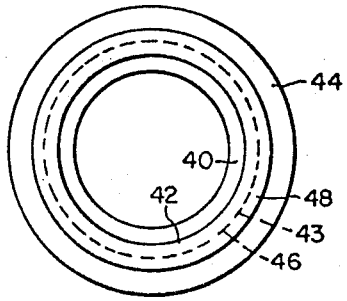
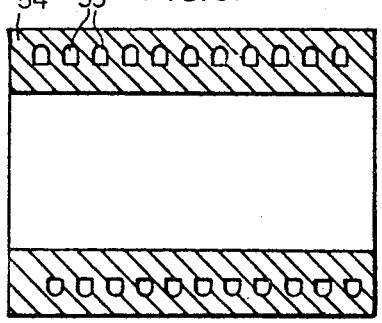
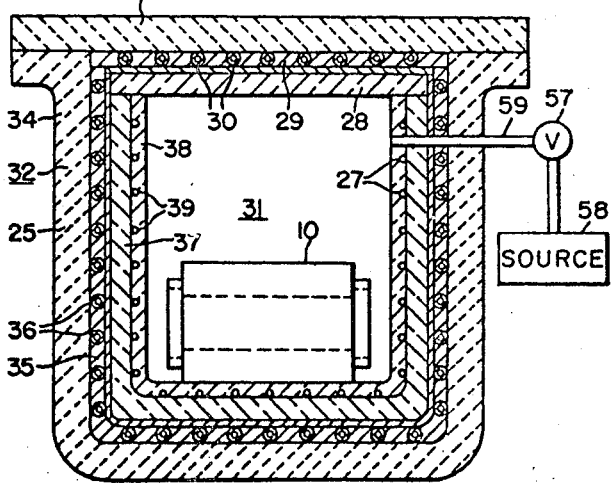

United States Patent Office 3,748,196
Patented July 24, 1973

3,748,196
METHOD OF UTILIZING HEAT AND PRESSURE TO CURE FLAWS IN METAL PIECES
George A. Kemeny, Export, Pa., assignor to Westinghouse Electric Corporation, Pittsburgh, Pa.
Original application May 20, 1968, Ser. No. 730,424, now Patent No. 3,601,884. Divided and this application May 21, 1971, Ser. No. 145,917
Int. Cl. C22f 3/00
U.S. Cl. 148—131                                      6 Claims

ABSTRACT OF THE DISCLOSURE

A component to have a passageway or passageways therein, for example for the flow of cooling fluid, is formed in two or more parts which fit closely together so that one surface of one part is adjacent a surface of the other part. At least one of the mating surfaces has grooves or channels therein which are to form the passageways for the cooling fluid. Thereafter the channels or grooves are evacuated and a vacuum seal provided. According to one process or method the parts have extending lips which are welded or otherwise joined together to form a seal for the evacuated channels. According to another method or process, the two parts after being fitted together are enclosed in a thin walled metal jacket of resilient material and the jacket evacuated and sealed. The sealed parts are then subjected for a suitable time and at a suitable temperature, as by placing in an autoclave, to a pressure in excess of that required to force the mating surfaces into intimate contact and sufficient to produce some deformation, with a resulting good bond but without so greatly reducing the cross-sectional area of the grooves or channels as to make them unsuitable for use as fluid flow passageways. One process aforedescribed is also a process for healing internal flaws. After the bonding is complete, the assembly is cooled and removed from the jacket, or the lips machined off, according to the process employed. An additional step may include annealing to produce further grain growth across the boundary between the parts joined together. In a further process, the passageway is filled with an inert gas at low pressure during the autoclave run. In an additional process, the passageway contains a solid or fluid "getter" material. In a still further process the passageway or passageways are continually pumped out while the assembled parts are being heated and subjected to external pressure.

CROSS REFERENCE TO RELATED APPLICATION

This application is a division of copending application Ser. No. 730,424, filed May 20, 1968, now Pat. No. 3,601,-884.

BACKGROUND OF THE INVENTION

Field of the invention

This invention relates to the construction of components including water cooled components suitable for high heat flux removal, and more particularly to a method of making components in separate parts having passageways formed therein, the separate parts being thereafter bonded together without introducing additional material which could plug the passages, and making a joint of substantially the same strength as the surrounding material and of the same thermal conductivity to prevent the introduction of additional thermal stresses. My methods are particularly well adapted for making parts for arc heaters.

A gas arc heater consists essentially of an enclosing vessel housing electrodes, insulating members, air admission means, and a suitable exit nozzle. Air or gas is continuously admitted into the arc heater cavity; it is there heated by interaction with an electric arc or a number of arcs and is then emitted through the exit nozzle. Additional interior members may exist for particular purposes such as starting, measuring performance, or introducing additional working fluid or chemicals into the arc heater cavity.

Due to the presence of the electric arc and intensely hot gases forming a plasma, all parts of an arc heater which view the heated interior of the cavity must be well cooled. For a given size arc heater, the higher the heat flux which can be removed by the structural parts, the higher the net output gas temperature which can be attained. Also higher heat flux removal capacity means a higher output rating for the arc heater. Inasmuch as substantial percentage of the heat transfer to the electrode structures and all other parts is through the phenomenon of radiation, and because the radiation source is very high in temperature, say of the order of 10,000° F. to 15,000° F., radiation heat flux to the structures is quite independent of their surface temperature. Radiation flux is roughly proportional to absolute temperature to the fourth power, and for a 10,000° F. source assuming all other things to be constant, the ratio of net heat flux radiated and thus lost to a 2,000° F. surface and an absolute zero temperature surface is about 0.998. For convective heat transfer from hot gas to metal, overcooling the metallic surfaces does not greatly increase convective heat loss to these parts. Summarizing, one cannot substantially overcool the arc heater components; extra cooling capacity results in high top gas temperature capability, higher ratings and reserve cooling capacity in case of emergency. The one limitation to cooling capacity is that the pumping power for the coolant must be kept within some reasonable limitation.

Hot gas exit nozzles for arc heaters require the greatest heat flux removal capacity near their throat area. The backside water cooling configurations utilized on these nozzles are the most elaborate heat removal schemes but involve extremely expensive machining methods. These methods, though applicable for nozzles, do not lend themselves to the water cooling configuration of other arc heater components.

Description of the prior art

It is believed that the most advanced state of the gas-pressure bonding art prior to my invention is well described by the following extract from Defense Metals Information Center Report 159(2), Sept. 25, 1961, Battelle Memorial Institute, Columbus, Ohio:

In the gas-pressure bonding process, the components to be bonded are fabricated or machined to final size, cleaned and assembled into an evacuated envelope. The assembled components are heated to an elevated temperature in an autoclave containing an inert gas at high pressure. The isostatic pressure is uniformly transmitted (through the container, if one is used) and forces all of the mating surfaces into intimate contact along any desired surface contour. The mating surfaces are held under pressure at temperature for a sufficient time to permit solid-state bonding between the components. The only deformation occurring during bonding is the amount necessary to bring the components into intimate contact. The dimensional tolerances achieved in the bonded assembly are therefore governed by the dimensional tolerance that is specified for each individual component. In experiments with many systems, the bonds produced by gas-pressure bonding under proper conditions have proven to be consistently strong, and the test specimens prepared have displayed satifscatory corrosion resistance and physical properties after the bonding process. In most cases, no trace of the original bond interface can be detected by metallographic examination or non-destructive testing.

It is clear from the statement that "The only deformation occurring during bonding is the amount necessary to bring the components into intimate contact" that the above described prior art process contemplates only joining two solid pieces with uninterrupted surfaces as mating surfaces.

Other prior art is exemplified in U.S. patents: Peyser 3,303,549; Pflumm et al. 2,947,078; Brick et al. 3,106,014; Kazakov 3,158,732; and Titus 3,067,507. Titus requires a separate material, a bonding or brazing material. The added material is brought to a temperature at which it melts, and the melted added material effects the joint. Furthermore, the method of Titus is carried out at low pressure; the difference between atmospheric pressure and a partially evacuated chamber. Kazakov relates to vacuum welding; when parts to be joined reach the required temperature, which has to be merely greater than the recrystallization temperature, they are subjected to a pressure of 1 to 2 kilograms per square millimeter, this not effecting any plastic deformation. In Brick et al. a cladding material is required to be added. Brick et al.'s inventive concept appears to relate to providing defined areas for the antiwelding substance. Pflumm et al. relates to solid-phase bonding of malleable metals, i.e., the joining of the same or different solid malleable metals in the forms of coaxial cores and shells without adding or otherwise producing a liquid-phase material between them, but at least one of the core or sleeve must have a work hardened surface to provide deformed crystals in a higher energy state, and the core must have a higher coefficient of expansion than either the sleeve, or a jacket enclosing the sleeve. Peyser relates to a vacuum welding process carried out for example $10^{-10}$ millimeters of mercury for the joining of two cleaned crystalline surfaces.

SUMMARY OF THE INVENTION

In summary, my invention relates to a method or manufacturing process which allows all arc heater components to be equipped with a cooling configuration, that is, passages for the flow of a cooling fluid as efficient for cooling as presently used primarily for nozzle throat areas. According to one method of my invention, the parts of a member which is to be cylindrical, for example, may be first formed in two cylindrical portions, one of which fits snugly inside the other, wth passageways or channels for the flow of a cooling fluid machined or otherwise cut in one of the cylindrical parts. The parts to be joined are cleaned and enclosed in a thin hermetically sealable metal jacket. This assembly is next degassed and pumped down with a vacuum pump and sealed. The bagged or jacketed components are then inserted in an autoclave furnace with pressure applied by a suitable inert gas. This gas exerts isostatic pressure over all the outside surfaces thus bringing the adjoining surfaces of the two cylindrical parts, or other joints into intimate contact. The parts are held at high pressure and elevated temperature for a sufficiently long time to effect diffusion or contact welding or bonding. The pressure exceeds that which would merely be required to hold two mating surfaces in intimate contact. During the bonding process some reduction in the cross-sectional areas of the channels occurs.

By the above described method, no braze material needs to be added, and accordingly no clogging occurs except that which may occur accidentally due to the collapse of a passage, which can be easily diagnosed as soon as the enclosing thin metal jacket is pealed off. The bond achieved by this method can be as strong as the parent metal.

The above method also heals flaws in the parts to be bonded together or in a single piece.

According to a second method, the arc heater component, for example a portion of the nozzle, is formed of an inner cylindrical portion having annular lips at each end thereof near the outside surface of the cylindrical part, that is the surface of larger diameter. This cylindrical inner portion is disposed in a cylindrical outer portion which closely or snugly fits against it, the outer or inner portion or both having fluid flow passageways machined or cut therein. Additional portions may be disposed between the inner and outer portions of the nozzle. The outer cylindrical portion also has annular lips or flanges at each end thereof adjacent the inner wall thereof, that is, the surface of smaller diameter. The annular lips or annular flanges of one cylindrical portion closely abut against the annular lips of the other cylindrical portion. The channels or passageways may be evacuated and the annular lips sealed or welded together in vacuum. This structure is put into a furnace or autoclave without breaking the vacuum and subjected to the necessary temperature for a substantial period of time. Additional pressure is provided in the furnace or autoclave exceeding that which would merely be required to hold two mating surfaces in intimate contact, and after a suitable time the two cylindrical portions are substantially perfectly bonded together as if they were formed integrally with each other. During the bonding process, some reduction in the cross-sectional areas of the channels occurs. After cooling the annular lips are machined off.

According to another process or method of practicing my invention, I fill the channels or passageways with a substantially inert gas at low pressure before the two parts to be joined are sealed together by as welding the lips, or sealing the jacket, and the inert gas remains in the channels until the assembly is removed from the autoclave.

According to a further method, a "getter" material which may be solid or fluid, and may be a reducing agent, such as hydrogen, is used to fill or partially fill the passageway before the two parts are sealed together, the getter material remaining in the assembly during the autoclave run.

According to still another method, I provide pump apparatus with connecting means extending into the autoclave and connecting with the passageway in the assembled parts, the passageway being continually pumped out or evacuated while the assembly is maintained at a high temperature and high external pressure.

All methods of practicing my invention permit the construction of components of greater complexity and with better strength and heat removal capacity than can be obtained using any conventional joining method. No additional material is required which could clog the fluid passageways. The joint is made of the same strength as the surrounding material, and of the same thermal conductivity to prevent introduction of additional thermal stresses. Furthermore, if for example two cylindrical parts are held together by pressure, they do not require very close fitting for joining. The looser the allowable tolerance the less expensive the finished device.

Accordingly, a primary object of my invention is to provide new and improved methods of constructing a component from two or more parts fitted together.

Another object is to provide new and improved methods of making components employing new and improved pressure bonding techniques.

A further object is to provide a new and improved method of constructing water cooled components for arc heaters and such like apparatus in which no additional brazing material which could clog or partially clog a fluid flow passage is introduced into the component.

Still another object is to provide a new and improved process for making high heat flux removal components in which a gas is employed to exert isostatic pressure over all outside surfaces thus bringing joints of a component formed in a plurality or number of parts into intimate contact and effect a good bond.

Another object is to provide a new and improved method of making water cooled components in which the bond between parts of the component is as strong as the parent metal.

Still a further object is to provide a new and improved process of constructing components for high heat flux removal in which the joints between parts of the components have the same thermal conductivity as the parent metal and thereby introduce no additional thermal stresses.

Still an additional object is to provide a new and improved process of constructing components in which parts to be joined do not need to be close fitting, but may be of loose tolerances.

An ancillary object is to provide a new and improved method of constructing arc heater components, in which the components are more economical to manufacture than could be done by prior art methods or processes.

Another object is to provide a method for healing flaws in metal part.

These and other objects will become more clearly apparent after a study of the following specification, when read in connection with the accompanying drawings, in which:

FIG. 1 is a view according to one process of my invention, in which the parts to be joined after evacuation are shown enclosed in a thin hermetically sealed metal jacket;

FIG. 2 is an end elevation of the structure of FIG. 1;

FIG. 3 shows two cylindrical parts joined for bonding according to a second method of practicing my invention in which the two cylindrical parts have annular lips at both ends thereof, the lips being welded together after the fluid flow passageways in the structure have been evacuated;

FIG. 4 is an end elevation of the structure of FIG. 3;

FIG. 5 shows the structure which is the end product produced by both the methods of FIG. 1 and FIG. 3 after the bonding process is complete and jacket or excess material removed;

FIG. 6 shows a simple autoclave suitable for use in the processes of the invention, means for supplying an inert gas under pressure thereto being shown.

Figure 7A:
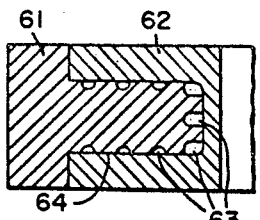
FIGS. 7A, 7B and 7C show heat shield ring configurations which may be constructed by the processes of my invention, the rings being generally circular after being joined.

Referring now to the drawings, in which like reference numerals are used throughout to designate like parts, for a more detailed understanding of the invention, and in particular to FIG. 1, which is a cross section through two concentric cylindrical portions arranged to be bonded, the inner cylindrical portion, which it is understood is composed of highly thermally conductive material such as copper, is designated 11. Coaxially disposed with respect to the cylindrical portion 11, is an outer cylindrical portion 12 having a spiralling or ring shaped fluid flow passageway or passageways cut or otherwise machined therein, this passageway or passageways being designated 13. The inner surface of cylindrical portion 12, designated 14, fits snugly against the outer surface 15 of the inner cylindrical portion 11. The two concentric cylindrical portions after being mounted together and thoroughly cleaned and disposed in position for bonding are enclosed in a thin metal jacket generally designated 17 adapted to be hermetically sealed. This metal jacket generally designated 17 may comprise an inner cylindrical portion 18, an outer cylindrical portion 19, and an annular ring shaped portion 20 at the left-hand end thereof as seen in the figure, and an annular ring shaped portion 21 at the right-hand end thereof in the figure, all of the joints between the various portions being welded together to form a jacket which is evacuated at a high degree of vacuum and thereafter hermetically sealed. If desired most of the welding may be done before evacuation, and the welding process completed in vacuum.

Particular reference is made now to FIG. 2, an end view of the structure of FIG. 1, in which the symmetrical arrangement of the two cylindrical portions is seen from another aspect.

Particular reference is made now to FIG. 6 which shows an autoclave generally designated 32. The autoclave has a body portion 25 and a top 26 which it is understood is maintained in position by any suitable means, not shown for convenience of illustration as by bolts at spaced intervals around the periphery thereof.

The wall of the body portion 25 is seen to comprise an outer heavy wall portion 34, a water cooled metal jacket 35 therein having fluid flow passageways 36, a thermal insulation portion 37 inside the metal jacket composed of, for example, a ceramic and a ceramic cylinder 38 inside the insulation portion, the cylinder 38 having a groove or grooves 39 in the outside wall thereof in which is disposed heating element 27. Heating element 27 is connected by leads, not shown to a suitable source of potential to energize the element 27. It will be understood that any suitable means, not shown, may be employed for regulating the temperature within the autoclave as by a thermostat which automatically regulates the power supplied to the heating element 27. The structure to be pressure bonded is generally designated at 10. Whereas the structure shown is more nearly in accordance with the teachings of FIG. 3, it will be understood that the structure 10 also includes the configuration of FIG. 1. A suitable pressure may be maintained inside the chamber 31 of the autoclave generally designated 32 by inert gas from source 58 admitted through conduit 59 and controlled by valve 57. Pressure and temperature within chamber 31 may be indicated by any convenient means, not shown. A suitable inert gas may be employed. Preferably the entire interior of the autoclave or the entire space not occupied by the heating element and the structure to be bonded 10 is filled with spherical aluminium oxide pellets, copper balls or similar material. This prevents natural circulation of heat currents being set up, destroying the heat pattern which is desired for uniform heating of the structure 10. The chamber 31 is filled almost to the top cover 28 with these pellets. Cover portion 29 may have fluid passageways 30. The workpiece 10 is covered deeply with the pellets, not shown.

Standard autoclaves may be employed in the process, these being available from a number of sources commercially, so that a further detailed description of the autoclave is deemed to be unnecessary.

The pellets could be other suitable ceramics or metal.

In more detail, after the two cylindrical portions 11 and 12 are cleaned, these being the parts to be joined, they are enclosed in the aforementioned thin hermetically sealable metal jacket generally designated 17. This assembly is next degassed, pumped down with a vacuum pump by any suitable of several possible, well known techniques, and sealed at for example, a point in the juncture between annular ring 21 and outside cylindrical portion 19, although other points are easily possible. The bagged or jacketed components are then inserted in the autoclave or furnace, being shown therein at 10, and pressure is applied within the furnace by suitable inert gas which may be for example helium. The parts are held at high pressure and elevated temperature for a period of, for example, 10 to 120 minutes, where pure copper is the material to be bonded. A typical pressure during this 10 to 120 minute interval would be 3000 to 5000 pounds per square inch, and a typical temperature would be from 1000° F. to 1200° F. Certain considerations affect the temperature and pressure which are maintained in the autoclave. The needed temperature and pressure are related to the fusion bonding capabilities of the material employed, the material configuration, the melting point, etc. Pure copper has been used as an example, but it will be understood that alloys also be used in forming parts to be bonded by the processes of my invention. If the pressure and/or temperature is too high, the passageways may be collapsed and accordingly there is an upper limit to the pressure and/or temperature which may be employed, depending upont the material and the dimensions of the passageways. With respect to the time, for longer times and at higher pressures the passageways decrease in size; a long time deformation occurs which is undesirable.

One suitable alloy which may be employed in an alloy of chromium and copper obtainable under the trademark "Cupalloy," a product of the Westinghouse Electric Corporation. Higher tensile strength may be obtained from the alloy than when using pure copper in the parts to be bonded.

Figure 7B:
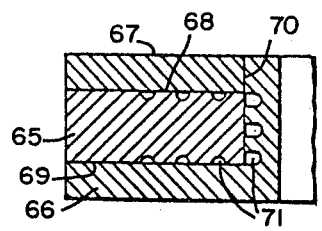
Figure 7C:
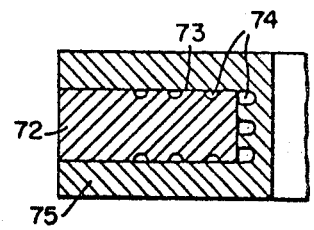

FIGS. 7A, 7B and 7C represent heat shield rings which may be constructed by the processes or methods of my invention. In FIG. 7A, 61 and 62 are portions to be bonded together, 64 is the bonding surface, and channels to form fluid passageways are shown at 63. In FIG. 7B, portions 65, 66 and 67 are to be bonded together having bonding surfaces 68, 69 and 70 and channels 71 to form fluid passageways. In FIG. 7C, portions to be bonded are shown at 72 and 75, the bonding surface at 73 and channels to form fluid passageways at 74.

Figure 8A:
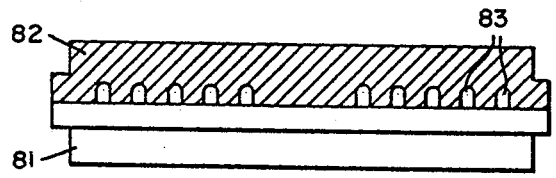
FIG. 8A shows a sample employed in tests of a multipassageway construction, hereinafter referred to as Type A.
Figure 8B:
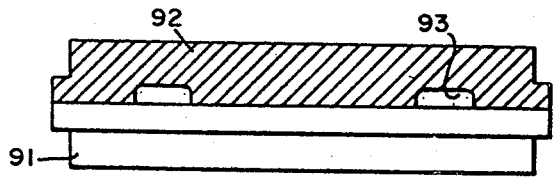
FIG. 8B shows a further sample employed in tests having therein a single passageway, hereinafter referred to as Type B.

Particular reference is made now to FIGS. 8A and 8B. In FIG. 8A, parts 81, and 82 having a plurality of concentric channels or passageways 83 therein, comprise a test sample type A, and in FIG. 8B parts 91, and 92 having one channel or passageway 93 therein, comprise a test sample, type B.

In all of the tests of samples A and B, the evacuated passageways were sealed by annular lips extending from the two parts to be joined, the lips being welded together, as described hereinabove as the second method of practicing my invention.

Chart or Table I following gives the original dimensions of eleven type A samples and nine type B samples employed in tests which were made.

TABLE I.—SPECIMEN DETAILS

| Specimen number | Channel width, W, inch | Channel depth, ht., inch | Channel center-line dim., Y, inch | Rib width, X, inch |
|---|---|---|---|---|
| A1 | .062 | .062 | .093 | .031 |
| A2 | .062 | .062 | .109 | .047 |
| A3 | .062 | .062 | .125 | .062 |
| A4 | .062 | .062 | .140 | .078 |
| A5 | .062 | .062 | .156 | .094 |
| A6 | .062 | .062 | .171 | .109 |
| A7 | .062 | .062 | .187 | .125 |
| A8 | .062 | .062 | .202 | .140 |
| A9 | .062 | .062 | .218 | .156 |
| A10 | .062 | .062 | .234 | .172 |
| A11 | .062 | .062 | .249 | .187 |
| B1 | .062 | .062 | | |
| B2 | .096 | .062 | | |
| B3 | .125 | .062 | | |
| B4 | .156 | .062 | | |
| B5 | .189 | .062 | | |
| B6 | .220 | .062 | | |
| B7 | .250 | .062 | | |
| B8 | .322 | .062 | | |
| B9 | .381 | .062 | | |

Table II, following, gives conditions during autoclave test run number one. Zero minutes corresponds to the time when the pressure within the autoclave attained the desired value of 4400 p.s.i It is seen that the pressure was reduced after 60 minutes. During autoclave run number one, a complete set of Type A samples and a complete set of Type B samples were within the autoclave.

TABLE II.—SUMMARY OF AUTOCLAVE RUN NUMBER 1

| Time, minutes | Temperature, ° F. | | | | | Pressure, p.s.i. |
|---|---|---|---|---|---|---|
| | TC2[1] | TC3 | TC4 | TC5 | TC6[2] | |
| −162 | 230 | 232 | 232 | 233 | 235 | 50 |
| −155 | 250 | 281 | 282 | 285 | 285 | 50 |
| −95 | 610 | 610 | 590 | 613 | 640 | 1,000 |
| −35 | | | | | | 2,500 |
| −15 | 920 | 945 | 940 | 1,020 | 1,028 | 2,500 |
| −10 | 928 | 1,025 | 965 | 1,020 | 1,028 | 2,500 |
| −5 | 950 | 1,035 | 995 | 1,050 | 1,050 | 2,500 |
| 0 | 957 | 1,055 | 1,028 | 1,078 | 1,070 | 4,400 |
| 5 | 965 | 1,095 | 1,050 | 1,103 | 1,060 | 4,400 |
| 10 | 990 | 1,100 | 1,062 | 1,112 | 1,065 | 4,400 |
| 15 | 978 | 1,110 | 1,070 | 1,112 | 1,003 | 4,400 |
| 20 | 957 | 1,110 | 1,075 | 1,112 | 1,028 | 4,400 |
| 25 | 945 | 1,110 | 1,070 | 1,090 | 1,008 | 4,400 |
| 30 | 937 | 1,120 | 1,065 | 1,070 | 975 | 4,400 |
| 35 | 915 | 1,120 | 1,062 | 1,060 | 954 | 4,400 |
| 40 | 895 | 1,107 | 1,070 | 1,040 | 945 | 4,400 |
| 45 | 886 | 1,107 | 1,079 | 1,050 | 945 | 4,400 |
| 50 | 858 | 1,090 | 1,057 | 1,037 | 945 | 4,400 |
| 55 | 830 | 1,090 | 1,057 | 1,037 | 954 | 3,400 |
| 60 | 820 | 1,070 | 1,057 | 1,080 | 986 | 4,400 |
| 65 | 812 | 1,070 | 1,057 | 1,050 | 995 | |
| 70 | 780 | 1,060 | 1,050 | 1,025 | 986 | Start slow bleed off. |
| 75 | 741 | 1,028 | 986 | 977 | 945 | |
| 80 | 728 | 986 | 945 | 940 | 905 | |
| 85 | 694 | 956 | 903 | 870 | 850 | |
| 90 | 670 | 940 | 862 | 830 | 820 | 4,000 |
| 150 | 760 | 830 | 820 | 820 | 830 | 2,500 |

[1] Top.
[2] Bottom.
NOTE.—Thermocouples #2 and #6 were only for this run outside the zone containing the specimens.

Table III, following, gives conditions during autoclave run number two, and zero time represents the time when the pressure in the autoclave reached the desired value of 3800 p.s.i. It was maintained for 60 minutes and then reduction started. A complete set of Type A samples and a complete set of Type B samples were within the autoclave during run number two.

TABLE III.—SUMMARY OF AUTOCLAVE RUN NUMBER 2

| Time, minutes | Temperature, ° F. | | | | | Pressure, p.s.i. |
|---|---|---|---|---|---|---|
| | TC2[1] | TC3 | TC4 | TC5 | TC6[2] | |
| −200 | 188 | 200 | 188 | 185 | 185 | 25 |
| −156 | 387 | 408 | 385 | 385 | 385 | 75 |
| −96 | 630 | 640 | 630 | 640 | 630 | 800 |
| −32 | 980 | 998 | 980 | 985 | 988 | 2,500 |
| −9 | 1,030 | 1,070 | 1,065 | 1,063 | 1,060 | 3,700 |
| 0 | 1,075 | 1,107 | 1,091 | 1,092 | 1,095 | 3,800 |
| 29 | 1,083 | 1,110 | 1,102 | 1,100 | 1,098 | 3,800 |
| 60 | 1,075 | 1,113 | 1,105 | 1,105 | 1,105 | 3,800 |
| 89 | 1,015 | 1,030 | 1,025 | 1,025 | 1,023 | 3,350 |
| 120 | 920 | 930 | 930 | 930 | 930 | 2,700 |
| 150 | 837 | 840 | 840 | 835 | 833 | 2,500 |
| 210 | 714 | 720 | 720 | 725 | 720 | 1,000 |

[1] Top.
[2] Bottom.

Table IV, following, gives conditions during autoclave run number three, and zero time represents the time when the pressure in the autoclave reached the desired value of 3000 p.s.i. After 60 minutes a reduction in pressure was started. The autoclave during run number three contained a complete set of Type A samples and a complete set of Type B samples. It will be observed that for all three runs, the test specimen temperature was about 1100° F., a temperature which had been determined to be satisfactory for the joining of specimens.

TABLE IV.—SUMMARY OF AUTOCLAVE RUN NUMBER 3

| Time, minutes | Temperature, °F. | | | | | Pressure, p.s.i. |
| --- | --- | --- | --- | --- | --- | --- |
| | TC2 [1] | TC3 | TC4 | TC5 | TC6 [2] | |
| −113 | 342 | 342 | 342 | 342 | 338 | 100 |
| −82 | 560 | 565 | 565 | 562 | 561 | 740 |
| −58 | 714 | 714 | 720 | 720 | 718 | 1,000 |
| −32 | 926 | 915 | 930 | 935 | 935 | 2,275 |
| −19 | 974 | 976 | 982 | 980 | 977 | 2,500 |
| 0 | 1,102 | 1,090 | 1,099 | 1,105 | 1,100 | 3,000 |
| 26 | 1,098 | 1,098 | 1,095 | 1,098 | 1,095 | 3,000 |
| 60 | 1,105 | 1,105 | 1,098 | 1,105 | 1,105 | 3,000 |
| 91 | 990 | 1,000 | 950 | 990 | 990 | 2,500 |
| 151 | 654 | 860 | 855 | 855 | 850 | 2,000 |
| 211 | 730 | 735 | 730 | 725 | 708 | 1,000 |

[1] Top.
[2] Bottom.

Table V, the following, shows the beam stress on Type B samples during autoclave runs one, two, and three, and the channel percentage height remaining after the bonding process was completed.

The single channel data are summarized in Table V and FIG. 9 hereinafter to be discussed. Since these samples each contained a single channel of a different width in a relatively extensive flat plane, two important pieces of data were derived from them. First, the minimum bonding conditions for joining extensive unbroken areas. Second, the maximum channel width that could be bonded without collapsing for a given set of bonding conditions and one beam height.

From the tabulated results of the bond quality study in Table VII it can be seen that at a pressure of 3800 p.s.i. at 1100° F. there is about a 75% chance of getting a good bond and at 4400 p.s.i. almost all bonds are good.

The quality of the bonds was determined visually after the diffusion anneal. The bond areas were polished, etched, and examined microscopically. In the samples where the grains had grown across the whole interface,

TABLE V.—BEAM STRESS ON SINGLE CHANNEL SPECIMENS

| Run | Specimen number | W | L | M | d | Z | S | Percent ht. remaining |
| --- | --- | --- | --- | --- | --- | --- | --- | --- |
| 1 | B1 | 4,400 | .0627 | 1.44 | .1872 | .0058 | 248 | 85.4 |
| | B2 | 4,400 | .0958 | 3.37 | .1872 | .0058 | 581 | 74.4 |
| | B3 | 4,400 | .1254 | 5.77 | .1861 | .0058 | 995 | 70.9 |
| | B4 | 4,400 | .1568 | 9.02 | .1880 | .0059 | 1,529 | 49.4 |
| | B5 | 4,400 | .1891 | 13.11 | .1877 | .0059 | 2,222 | 33.9 |
| | B6 | 4,400 | .2203 | 17.79 | .1883 | .0059 | 3,015 | |
| | B7 | 4,400 | .2497 | 22.86 | .1878 | .0059 | 3,875 | |
| | B8 | 4,400 | .3221 | 38.04 | .1878 | .0059 | 6,447 | |
| | B9 | 4,400 | .3814 | 53.34 | .1883 | .0059 | 9,041 | |
| 2 | B1 | 3,800 | .0629 | .125 | .1885 | .0059 | 212 | 89.6 |
| | B2 | 3,800 | .0957 | 2.90 | .1840 | .0056 | 518 | 76.7 |
| | B3 | 3,800 | .1312 | 5.45 | .1844 | .0057 | 956 | 71.5 |
| | B4 | 3,800 | .1574 | 7.84 | .1830 | .0056 | 1,400 | 67.9 |
| | B5 | 3,800 | .1892 | 11.34 | .1857 | .0057 | 1,989 | 72.9 |
| | B6 | 3,800 | .2226 | 15.69 | .1857 | .0057 | 2,753 | 30.5 |
| | B7 | 3,800 | .2519 | 20.09 | .1874 | .0059 | 3,405 | 19.5 |
| | B8 | 3,800 | .3246 | 33.37 | .1842 | .0057 | 5,854 | |
| | B9 | 3,800 | .3941 | 49.18 | .1899 | .0060 | 8,197 | |
| 3 | B1 | 3,000 | .0618 | 1.05 | .1848 | .0057 | 184 | 97.7 |
| | B2 | 3,000 | .0931 | 2.30 | .1827 | .0056 | 411 | 95.7 |
| | B3 | 3,000 | .1242 | 4.11 | .1836 | .0056 | 735 | 97.1 |
| | B4 | 3,000 | .1566 | 6.53 | .1851 | .0057 | 1,145 | 93.1 |
| | B5 | 3,000 | .1889 | 9.53 | .1862 | .0058 | 1,643 | 85.0 |
| | B6 | 3,000 | .2204 | 13.00 | .1858 | .0058 | 2,240 | 93.1 |
| | B7 | 3,000 | .2513 | 16.85 | .1860 | .0058 | 2,905 | 75.5 |
| | B8 | 3,000 | .3229 | 27.80 | .1833 | .0056 | 4,970 | |
| | B9 | 3,000 | .3859 | 39.70 | .1872 | .0058 | 6,860 | |

The equation used for calculating the stress values in Table V was derived from the standard flexure equation for beams:

$$S = \frac{Mc}{I}$$

where $S$ = stress
$M$ = bending moment
$I$ = moment of inertia of area
$c$ = distance from the neutral axis to the remotest element Substituting Z, the section modulas, for $I/c$ one arrives at the equation $$S = \frac{M}{Z}$$

For a rectangular cross-section $$Z = \frac{bd^2}{6}$$

where $d$ = beam height and $b$ = beam length (1 in. ass.).

The maximum moment for the type of loading on the beams above the water channels is given by:

$$M = \frac{wL^2}{14}$$

where $w$ = autoclave pressure
$L$ = beam length the bonds were marked good. In the bonds where interfacial grain grown was intermittent but the remainder of the joint was in intimate contact, the samples were judged fair. In the samples where there was complete contact across the sample but only an occasional spot where the grains had grown completely across the interface the bond was marked questionable. The samples with obvious voids on cracks at the interface were marked poor.

Figure 9:
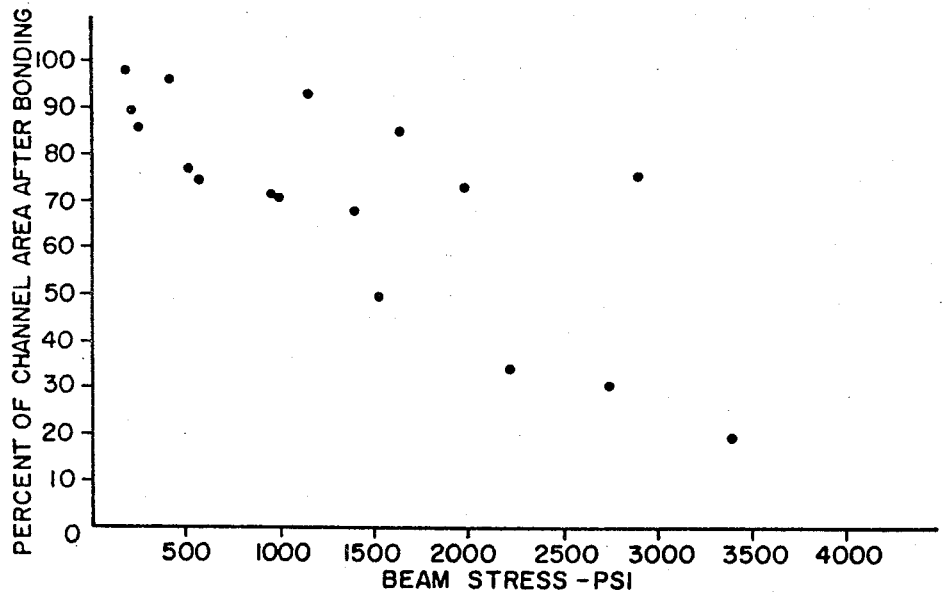
FIG. 9 is a chart of percent of channel area remaining after bonding at various beam stresses in p.s.i. for a number of samples of the B type.

Knowing that the bonding pressure should be at least 3800 p.s.i. and preferably 4400 p.s.i. or higher for bonding areas that do not contain channels, it is apparent from the data tabulated in Table V and graphed in FIG. 9 that the beam stress in the beam above a channel should be kept at 250 p.s.i. or less in order that at least about 85% of the channel height should be retained after bonding.

Table VI, following, shows test results of type A multiple channel specimens for the three autoclave runs. In the first column in the table, left to right, there is identified the autoclave run number and the sample number. The eighth column from the left shows the percentage of channel height remaining, and the tenth column from the left shows the percentage of channel area remaining, these being a measure of success or failure. If the area percentage remaining exceeded about 75%, it was regarded as substantially satisfactory.

TABLE VI.—MULTIPLE CHANNEL SPECIMENS

| Run number and sample number | Pre-bond dimensions | | | Post-bond dimensions | | | Percent of original | | | $P_1$ | $P_2$ | $S_1$ | $S_2$ |
|---|---|---|---|---|---|---|---|---|---|---|---|---|---|
| | Ht. | W | Area | Ht. | W | Area | Ht. | W | Area | | | | |
| 1A1 | .0637 | .0645 | 41.04 | .0052 | .0016 | 0.25 | 8.1 | 2.5 | 0.6 | 4,400 | 1,614 | 13,341 | 4,848 |
| 1A2 | .0570 | .0627 | 35.78 | .0221 | .0101 | 2.07 | 38.8 | 16.1 | 6.5 | 4,400 | 2,185 | 10,296 | 5,069 |
| 1A4 | .0617 | .0634 | 39.13 | .0306 | .0120 | 3.67 | 49.6 | 18.9 | 9.4 | 4,400 | 2,801 | 7,898 | 5,028 |
| 1A5 | .0641 | .0626 | 40.10 | .0311 | .0111 | 3.58 | 48.5 | 17.8 | 8.9 | 4,400 | 2,987 | 7,304 | 4,954 |
| 1A6 | .0635 | .0634 | 40.28 | .0393 | .0274 | 10.78 | 61.9 | 43.2 | 26.8 | 4,400 | 3,484 | 6,943 | 5,469 |
| 1A7 | .0635 | .0630 | 40.01 | .0449 | .0318 | 14.27 | 70.7 | 50.4 | 35.6 | 4,400 | 3,699 | 6,582 | 5,538 |
| 1A8 | .0640 | .0635 | 40.58 | .0440 | .0369 | 16.37 | 68.8 | 58.2 | 40.3 | 4,400 | 3,870 | 6,380 | 5,584 |
| 1A9 | .0637 | .0640 | 40.78 | .0479 | .0388 | 18.58 | 75.2 | 60.6 | 45.5 | 4,400 | 4,015 | 6,178 | 5,607 |
| 1A10 | .0636 | .0634 | 40.28 | .0523 | .0469 | 24.58 | 83.2 | 74.1 | 61.1 | 4,400 | 4,209 | 5,984 | 5,727 |
| 1A11 | .0581 | .0632 | 36.74 | .0513 | .0506 | 25.94 | 88.2 | 80.0 | 70.6 | 4,400 | 4,332 | 5,883 | 5,768 |
| 2A1 | .0647 | .0645 | 41.93 | .0251 | .0140 | 3.56 | 39.3 | 21.6 | 8.5 | 3,800 | 1,487 | 11,522 | 4,465 |
| 2A2 | .0629 | .0631 | 39.69 | .0293 | .0212 | 6.20 | 46.6 | 33.6 | 15.6 | 3,800 | 2,031 | 8,892 | 4,712 |
| 2A3 | .0639 | .0627 | 40.04 | .0382 | .0314 | 12.00 | 59.7 | 50.2 | 30.0 | 3,800 | 2,537 | 7,661 | 5,073 |
| 2A4 | .0644 | .0621 | 40.11 | .0438 | .0371 | 16.18 | 67.5 | 59.8 | 40.3 | 3,800 | 2,845 | 6,821 | 5,107 |
| 2A5 | .0647 | .0622 | 40.39 | .0460 | .0383 | 17.59 | 70.8 | 61.6 | 43.6 | 3,800 | 3,036 | 6,308 | 5,035 |
| 2A6 | .0637 | .0623 | 39.72 | .0475 | .0453 | 21.52 | 74.2 | 73.0 | 54.2 | 3,800 | 3,287 | 5,996 | 5,160 |
| 2A7 | .0634 | .0621 | 39.68 | .0488 | .0472 | 23.27 | 77.2 | 76.0 | 58.6 | 3,800 | 3,391 | 5,685 | 5,077 |
| 2A8 | .0636 | .0627 | 39.94 | .0540 | .0523 | 28.27 | 84.8 | 73.5 | 70.8 | 3,800 | 3,547 | 5,510 | 5,119 |
| 2A9 | .0637 | .0624 | 39.75 | .0540 | .0518 | 28.00 | 84.6 | 83.3 | 70.4 | 3,800 | 3,567 | 5,335 | 4,982 |
| 2A10 | .0640 | .0626 | 40.05 | .0547 | .0526 | 28.78 | 85.3 | 84.2 | 71.9 | 3,800 | 3,600 | 5,168 | 4,898 |
| 2A11 | .0632 | .0631 | 40.05 | .0557 | .0550 | 30.62 | 88.0 | 86.9 | 76.4 | 3,800 | 3,659 | 5,081 | 4,872 |
| 3A1 | .0656 | .0641 | 42.03 | .0373 | .0314 | 11.69 | 56.8 | 49.0 | 27.8 | 3,000 | 1,433 | 9,096 | 4,505 |
| 3A2 | .0637 | .0650 | 41.32 | .0434 | .0354 | 15.35 | 68.0 | 54.6 | 37.2 | 3,000 | 1,802 | 7,020 | 4,434 |
| 3A4 | .0643 | .0641 | 41.35 | .0560 | .0518 | 29.02 | 87.0 | 80.6 | 70.2 | 3,000 | 2,584 | 5,385 | 4,752 |
| 3A5 | .0648 | .0649 | 41.76 | .0575 | .0542 | 31.19 | 88.4 | 83.3 | 73.7 | 3,000 | 2,687 | 4,980 | 4,590 |
| 3A6 | .0626 | .0650 | 41.17 | .0578 | .0565 | 32.66 | 91.8 | 85.9 | 78.9 | 3,000 | 2,778 | 4,734 | 4,467 |
| 3A7 | .0638 | .0654 | 41.62 | .0585 | .0573 | 33.52 | 91.7 | 87.9 | 80.5 | 3,000 | 2,813 | 4,488 | 4,320 |
| 3A9 | .0586 | .0638 | 37.28 | .0561 | .0594 | 33.27 | 96.0 | 93.0 | 89.3 | 3,000 | 2,917 | 4,212 | 4,116 |
| 3A10 | .0584 | .0641 | 37.61 | .0568 | .0599 | 33.99 | 96.7 | 93.5 | 90.4 | 3,000 | 2,927 | 4,080 | 4,029 |

The end channels in each of the multiple channel specimens were deformed to a lesser extent than the center channels due to the added support given by the solid center hub and outer rim. To minimize the influence of this added support in averaging the channel dimensions, the inner and outer channels were eliminated from all calculations.

In the summary of the multiple channel data in Table VI:

$P_1$ is the autoclave pressure.
$S_1$ is the compressive stress on the ribs before any deformation occurs.
$S_2$ is the compressive stress on the ribs after deformation.
$P_2$ is the critical autoclave pressure below which no deformation occurs.
W & Ht are the width and depth of the coolant channels—see Table I.

At the beginning of rib-bonding run, assuming mating surfaces in contact, the compressive stress ($S_1$) exerted on a rib is represented by $$S_1 = \frac{P_1 Y}{X}$$

where:

Y = Distance between center-lines of channels—see Table I
X = Rib width—see Table I During the rib-bonding run the size of the channel is reduced due to deformation of the ribs between channels. Since the autoclave pressure and the center-line between the channels have remained constant we may assume the rib has deformed to a width which can support the stress on the rib. (This is not strictly true since the creep which occurs during the run is a time dependent function.) If we now recalculate the stress using the new rib width (X') we arrive at a stress value ($S_2$) which approximates the load a copper rib will support at the bonding conditions used.

Using this new compressive stress value ($S_2$) and the original rib width we can calculate the autoclave pressure ($P_2$) which would have produced this compressive stress.

For example, if we had an autoclave pressure of 3000 p.s.i., a rib width of .060", and a channel center-line distance of .120", the compressive stress on the rib would be:

$$S_1 = \frac{3000 \times .120}{.060} = 6000 \text{ p.s.i.}$$

If the rib increases in width from .060 to .080 during the bonding run, the compressive stress would have decreased to 4,500 p.s.i.

$$S_2 = \frac{3000 \times .120}{.080} = 4500 \text{ p.s.i.}$$

If we neglect the increase in rib width due to creep and assume all deformation was due to the compressive stress, we can assume that this copper rib can support a compressive stress of 4,500 p.s.i. at the bonding temperature.

We can then go back and calculate the autoclave pressure ($P_2$) that should be used to keep the rib deformation at a minimum.

$$4500 \text{ p.s.i.} = \frac{P_2 \times .120}{.060}$$

$P_2 = 2,250$ p.s.i.

We conclude with a rib width of .060", a channel center-line distance of .120", and the bonding temperature used in the example, that 2,250 p.s.i. is the critical autoclave pressure below which little deformation will occur. The calculated values of $P_2$ from the first run were used to determine the autoclave pressure for the second run. The pressure was selected so as to have some samples with little or no deformation and some samples with a predictable deformation. These samples with $P_2$ values below 3,800 p.s.i., the selected pressure level for the second run, should have little or no deformation and those with $P_2$ values above 3,800 p.s.i. should deform. This same type of calculation was used to determine the autoclave pressure for run number 3. The deformation was more than predicted from the calculations, probably due to creep which is not included in the stress calculation.

Figure 10:
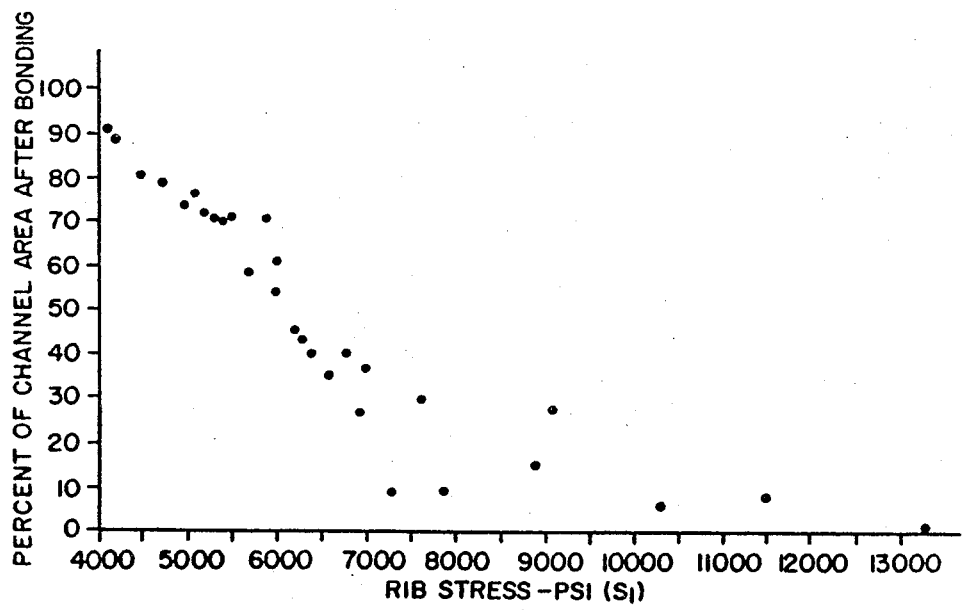
FIG. 10 is a chart of percent of channel area remaining after bonding at various rib stresses in p.s.i. for a number of samples of the A type.

FIG. 10 hereinafter to be discussed shows the relationship between the rib compressive stress ($S_1$) and the percentage of the original channel area remaining after the bonding runs. In order to keep the reduction in channel area from exceeding 25%, the compressive stress on the ribs as used in these experiments should not exceed 5,000 p.s.i.

In the preceding paragraphs criteria have been developed for stress, temperature and time conditions which will result in adequate bonding without resulting in excessive passage cross-sectional area reduction. These relations have been developed for copper. It must be understood that the designer must use these criteria in order to determine the geometry of the configuration to be joined. In some cases where there are complicated passage configurations, different passage sizes and/or spacing all in one single assembly, it may be desirable to locally reduce the forces induced by the autoclave gas pressure. This may be done by designing the jacketing configuration (FIG. 1) with suitable heavier components which may locally carry some of the pressure loads.

The conclusions reached from the diffusion bonding of copper to copper components at 1100° F., was that the interfacial stresses should be at least 3,800 p.s.i. and preferably 4,400 p.s.i. or more. A reduction in channel size will always occur during bonding and should be allowed for in the design. To minimize the reduction in channel size the stress in the ribs between channels must be kept below 5,000 p.s.i. and the width of the channel should not exceed 50% of the thickness of material above the channel.

Table VII, following, shows results of visual inspection of bonds of both type A and type B samples after autoclave runs one, two, and three.

TABLE VII.—MICROSCOPICALLY DETERMINED BOND QUALITY

| Specimen number | Run #1 (4,400 p.s.i.) | Run #2 (3,800 p.s.i.) | Run #3 (3,000 p.s.i.) |
|---|---|---|---|
| Multiple channel specimens | | | |
| A1 | Questionable | Good | Good. |
| A2 | Good | do | Do. |
| A3 | do | do | 75% good, 25% fair. |
| A4 | do | Fair to good | Good. |
| A5 | do | Good | Questionable. |
| A6 | do | do | Poor. |
| A7 | do | do | Good. |
| A8 | do | do | |
| A9 | do | do | Questionable. |
| A10 | do | Fair to good | 75% good, 25% questionable. |
| A11 | do | Good | |
| Single channel specimens | | | |
| B1 | Fair to good | Good | Questionable. |
| B2 | Good | do | Do. |
| B3 | do | Good to fair | Poor. |
| B4 | do | Good | Do. |
| B5 | do | do | Questionable. |
| B6 | do | do | Good. |
| B7 | do | Questionable | Questionable. |
| B8 | do | do | Good. |
| B9 | do | 75% good, 25% questionable | |

Particular reference is made now to FIG. 9. The dots represent individual type B samples, and some represent successes while others represent failures, as aforeexplained.

Particular reference is made now to FIG. 10. The dots represent individual type A samples, and some represent successes while others represent failures, as aforeexplained.

Particular reference is made now to FIG. 3 where a structure suitable for practicing my invention according to a second method or process is shown. In FIG. 3, an inner cylindrical portion 40 composed of, for example, copper, has an annular lip 41 at one end, and an annular lip 42 at the other end, with an outer surface 43. An outer cylindrical portion 44 has spiral passageway or ring shaped passageways 45 cut therein, and has an inner surface 46 snugly fitting the aforementioned outer surface 43 of cylindrical portion 40. The outer cylindrical portion has annular lips 47 and 48 at the ends thereof. Annular lip 41 is welded to annular lip 47 by an annular weld 49, and annular lip 42 is welded to annular lip 48 by an annular weld 50 after the passageway 45 has been evacuated.

Particular reference is made now to FIG. 4, an end elevation of the structure of FIG. 3, where the symmetry of the arrangement is shown in greater clarity.

In practicing the method of the invention according to FIG. 3, the two portions to be bonded, after being cleaned, evacuated and sealed, are placed in the autoclave generally designated 32, being shown therein at 10, and maintained at a predetermined temperature and predetermined pressure for a given period of time in the autoclave chamber 31.

Particular reference is made now to FIG. 5, which shows the bonded final structure which is produced by either of the methods described in connection with FIGS. 1 or 3. In FIG. 5, it is seen that the final result is one substantially solid cylindrical member 54 having spiral or ring shaped passageway 55 therein; cylindrical portions have merged into one, in effect, integrally formed member.

Summarizing: Although processes somewhat similar to mine have been employed in past for other purposes, I am the first to discover or realize that the process of my invention could be used to make components with passages for fluid cooling, in structures to operate at high pressures and at high temperature conditions, I am the first to make waterproof or water tight passages of small diameter to operate at high water pressures. By considerable experimentation and insight, I have discovered that certain pressures and temperatures are right for certain metals, having certain dimensions, and could be employed satisfactorily without having the passages collapse during the bonding treatment. I had to experiment to find out at what pressure and at what temperature a good joint was obtained without collapsing the passages.

It will be further understood that in an arc heater, the high operating temperature of metal parts results from high heat flux, and accordingly I had to, by considerable thought or experimentation, find out what temperatures and pressures were suitable for joining parts of thermally conductive metal and still making parts in which the passages did not collapse, and the joints were substantially as strong as the parent metal. Furthermore, as is well known in the art, in the heat transferred to the fluid in the passages, the fluid should be at high pressure and high velocity to provide substantial cooling. Devising apparatus and conditions which would permit my process to be satisfactorily performed was complicated by the fact that small fluid flow passages are required in arc heater components, and excess material cannot be allowed to clog the passages. Furthermore, I have discovered that my process permits mating surfaces to produce a good joint with the pressure forcing the surfaces together, even if the surfaces are not a perfect fit. This offers a distinct advantage over brazing which has a number of limitations; for example, if the pressure is too high, the surfaces will be too close together and brazing cannot be done; on the other hand, if the surfaces are too far apart, one cannot braze as the braze material is not drawn into the joint. The method of my invention reduces the need for very close tolerances. The pressure forces the surfaces together. Furthermore, the method of my invention offers "self-healing" of any cracks in the material, since the surfaces of the crack will be bonded together during the process.

The metal jacket 17 of FIG. 1 may be made of very thin stainless steel, for example, although other materials may be employed.

It will be understood that the nozzles or other components 10 are shown as cylindrical merely for the sake of simplicity. One end of the nozzle may flare outwardly and the other end of the nozzle may flare outwardly or taper inwardly as desired. For example, two substantially conical shaped members could be bonded together with equal facility. Furthermore, the passages 13 or 45 instead of passing circumferentially around a member could be machined in a longitudinal direction.

In both the embodiments of FIG. 1 and FIG. 3, most of the welding necessary in the one case to completely seal the steel jacket, and in the other case to weld the annular lips together, can be done outside of a vacuum, then the structure can be placed in a vacuum and allowed to remain therein long enough to evacuate the passageway after which the very little remaining welding may be done in the vacuum. Whereas 49 and 50 have been described as welds, it will be understood that these joints could be joined by other means as long as a tight joint is formed which will not leak at autoclave temperature and pressure.

With particular reference now to an additional method which may be practiced according to both FIG. 1 and FIG. 3, passageways 13 or 45 may be filled with an inert gas, such as argon, at low pressure, for example, a few atmospheres, and the two parts of the assembly sealed, the assembly being thereafter placed in the autoclave. Time, temperature, and pressure conditions in the autoclave may be the same as those employed when passages are evacuated, or if desired may be varied slightly therefrom.

In another method which may be practiced according to both FIG. 1 and FIG. 3, a fluid "getter" material, such as a reducing agent, such as hydrogen, is forced into passages 13 or 45 substantially filling the same, whereafter the assembled parts are sealed together and the assembly placed in the autoclave. Time, temperature, and pressure conditions may be similar to those of the last process described hereinbefore. In lieu of a fluid, a solid getter material, such as pellets, may be used to fill or partially fill the passages before sealing.

In another method preferably practiced with two parts joined as illustrated in FIG. 3, a vacuum pump located outside the autoclave has a conduit which extends through the autoclave wall. A bore, which may be threaded, extends through the wall of element 44 and communicates with the spiral passageway 45. The conduit to the vacuum pump communicates with the bore, a hermetical seal being provided, and passageway 45 is continuously or intermittently pumped out during the autoclave run, thereby obviating the effect of any leak in the sealed assembly. Time, temperature, and external pressure conditions in the autoclave may be similar to those set forth hereinbefore.

Cracks or flaws both entirely enclosed in a structure or if extending to the surface, may be healed or rejoined by utilizing the jacket structure of FIG. 1. If the cracks are entirely internal and do not communicate to the surface, they may be healed or rejoined by subjecting the part to the proper temperature and pressure in the autoclave.

As previously stated, the thermal conductivity of the joints is as great as that of the metal so that thermal stresses due to variable thermal conductivity do not exist in the finished product.

As previously explained, on additional material is inserted, so that there is no possibility of clogging the passageways other than by the collapse of the wall of the passageway due to too great pressure.

An additional step which I employ with either of the aforedescribed processes is annealing after the Rib-Bonding. After the pressure is removed I reheat the assembly to a higher temperature of the order of 850° C. to 900° C. (1650° F.) for copper to allow further grain growth across the boundary.

Whereas I have described my invention primarily with respect to the construction of arc heater components, it can be used wherever high heat fluxes are to be encountered, for example, in thermonuclear fusion devices, or presently existing nuclear fuel handling elements or in any other structures where it may be desired to produce passages or conduits in a matrix of surrounding material.

An arc heater in which substantially all of the component parts which are fluid cooled may be constructed by the methods disclosed herein is described and claimed in the copending application of Charles B. Wolf and George A. Kemeny for "Multi-electrode Arc Heater," Ser. No. 599,032, filed Dec. 5, 1966.

The aforegoing written description and the drawings are illustrative and exemplary only and are not to be interpreted in a limiting sense.

I claim as my invention:

1. The method of curing a flaw in a piece of metal, said flaw communicating with the outside surface of the piece, which comprises the steps of enclosing the piece of metal in a flexible jacket, evacuating substantially all of the gas inside the jacket and thereafter hermetically sealing the jacket to maintain a vacuum therein, placing the piece in an autoclave, placing spherical pellets within said autoclave to prevent the circulation of heat currents therein which would destroy the desirable heat pattern therein, raising the temperature of the piece to a predetermined high value which is less than the melting point temperature of said metal, creating a predetermined high pressure within the autoclave and subjecting the piece to the pressure and temperature for a predetermined period of time sufficient to heal said flaw.

2. The method as claimed in claim 1 wherein said flexible jacket comprises metallic material.

3. The method as claimed in claim 1 wherein said spherical pellets comprise aluminum oxide.

4. The method as claimed in claim 1 wherein said spherical pellets comprise a metal.

5. The method as claimed in claim 4 wherein said metal comprises copper.

6. The combination as claimed in claim 1 wherein said spherical pellets comprise ceramic material which is heat conducting.

References Cited
UNITED STATES PATENTS

| | | | |
|---|---|---|---|
| 3,496,624 | 2/1970 | Kerr et al. | 148—131 X |
| 3,329,535 | 7/1967 | Langer et al. | 148—4 |
| 2,878,140 | 3/1959 | Barr | 29—182 X |
| 3,092,524 | 6/1963 | Giovannucci | 148—13 R |
| 3,157,540 | 11/1964 | Bobrowsky | 148—131 |

CHARLES W. LANHAM, Primary Examiner

D. C. REILEY III, Assistant Examiner

U.S. Cl. X.R.

29—402, 526.2, DIG. 21